US011438250B2

(12) United States Patent
Venkatesh et al.

(10) Patent No.: US 11,438,250 B2
(45) Date of Patent: Sep. 6, 2022

(54) DISTRIBUTED MONITORING IN CLUSTERS WITH SELF-HEALING

(71) Applicant: SAP SE, Walldorf (DE)

(72) Inventors: Sandeep Venkatesh, Bangalore (IN); Pradeep Gunda Bhat, Bangalore (IN); Amit Kumar Ray, Dist-Jagatsinghpur (IN)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 17/234,290

(22) Filed: Apr. 19, 2021

(65) Prior Publication Data

US 2021/0243096 A1 Aug. 5, 2021

Related U.S. Application Data

(63) Continuation of application No. 17/025,861, filed on Sep. 18, 2020, now Pat. No. 11,075,829, which is a
(Continued)

(51) Int. Cl.
*G06F 11/07* (2006.01)
*H04L 43/0817* (2022.01)
(Continued)

(52) U.S. Cl.
CPC ...... *H04L 43/0817* (2013.01); *G06F 11/0793* (2013.01); *G06F 11/3006* (2013.01);
(Continued)

(58) Field of Classification Search
CPC ............. G06F 11/0793; G06F 11/0709; G06F 11/3048; G06F 11/3055; H04L 43/0817;
(Continued)

(56) References Cited

U.S. PATENT DOCUMENTS 9,430,318 B2 8/2016 Aggarwal et al.
10,133,619 B1 11/2018 Nagpal et al.
(Continued)

OTHER PUBLICATIONS

Non-Final Office Action issued in U.S. Appl. No. 16/206,129 dated Jun. 11, 2020, 5 pages.
(Continued)

*Primary Examiner* — Yolanda L Wilson
(74) *Attorney, Agent, or Firm* — Fish & Richardson P.C.

(57) ABSTRACT

The present disclosure involves systems, software, and computer implemented methods for distributed monitoring in clusters with self-healing. One example method includes determining, by a monitoring agent of a first node of a cluster, a self-monitoring check to perform for the first node. The first node is among multiple, other nodes included in the cluster. In response to receiving a successful status for the self-monitoring check, a registry in the first node is updated with the successful status. The registry includes node statuses for each node in the cluster. In response to receiving an unsuccessful status for the self-monitoring check, the monitoring agent performs at least one corrective action on the first node and updates the registry in the first node with a result of the at least one corrective action. The registry is broadcasted to each of the other nodes in the cluster as an updated registry.

14 Claims, 7 Drawing Sheets

Related U.S. Application Data continuation of application No. 16/206,129, filed on Nov. 30, 2018, now Pat. No. 10,911,342.

(51) Int. Cl.

| | | |
|---|---|---|
| *G06F 11/30* | (2006.01) | |
| *H04L 43/0823* | (2022.01) | |
| *H04L 41/0654* | (2022.01) | |
| *H04L 41/069* | (2022.01) | |
| *H04L 43/04* | (2022.01) | |

(52) U.S. Cl.
CPC ........ *G06F 11/3048* (2013.01); *H04L 41/069* (2013.01); *H04L 41/0672* (2013.01); *H04L 43/04* (2013.01); *H04L 43/0823* (2013.01)

(58) Field of Classification Search
CPC ... H04L 41/0672; H04L 41/069; H04L 43/04; H04L 43/0823
See application file for complete search history.

(56) References Cited

U.S. PATENT DOCUMENTS

| | | | |
|---|---|---|---|
| 10,911,342 | B2 | 2/2021 | Venkatesh et al. |
| 2006/0010351 | A1 | 1/2006 | Lee |
| 2009/0092054 | A1 | 4/2009 | Compton et al. |
| 2009/0113051 | A1 | 4/2009 | Franklin |
| 2009/0245098 | A1 | 10/2009 | Baker et al. |
| 2009/0285107 | A1 | 11/2009 | Sakurai et al. |
| 2012/0072769 | A1* | 3/2012 | Goldszmidt ........ G06F 11/0793 714/E11.178 |
| 2012/0146673 | A1 | 6/2012 | Kim et al. |
| 2013/0232377 | A1 | 9/2013 | Kakihara et al. |
| 2013/0262935 | A1 | 10/2013 | Kutchuk et al. |
| 2013/0336104 | A1* | 12/2013 | Talla ................... G06F 11/076 370/216 |
| 2014/0289398 | A1 | 9/2014 | Nakai et al. |
| 2015/0113313 | A1* | 4/2015 | Chen .................. G06F 11/2035 714/4.11 |
| 2016/0261688 | A1* | 9/2016 | Anand ................. G06F 9/5061 |
| 2016/0321147 | A1* | 11/2016 | Kizhakkiniyil ..... G06F 11/3006 |
| 2017/0163488 | A1 | 6/2017 | Langston et al. |
| 2017/0212653 | A1 | 7/2017 | Kanojia et al. |
| 2019/0089611 | A1* | 3/2019 | Kondalam .............. H04L 43/10 |
| 2020/0177481 | A1 | 6/2020 | Venkatesh et al. |
| 2021/0006480 | A1 | 1/2021 | Venkatesh et al. |

OTHER PUBLICATIONS

Non-Final Office Action issued in U.S. Appl. No. 17/025,861 dated Nov. 27, 2020, 7 pages.

\* cited by examiner

DISTRIBUTED MONITORING IN CLUSTERS WITH SELF-HEALING

CLAIM OF PRIORITY

This application claims priority under 35 USC § 120 to U.S. patent application Ser. No. 17/025,861, filed on Sep. 18, 2020 entitled "DISTRIBUTED MONITORING IN CLUSTERS WITH SELF-HEALING"; which claims priority under 35 USC § 120 to U.S. patent application Ser. No. 16/206,129, filed on Nov. 30, 2018 entitled "DISTRIBUTED MONITORING IN CLUSTERS WITH SELF-HEALING", the entire contents of which are hereby incorporated by reference.

TECHNICAL FIELD

The present disclosure relates to computer-implemented methods, software, and systems for distributed monitoring in clusters with self-healing.

BACKGROUND

A network monitoring system can monitor a computer network for slow or failing components and notify administrators if an issue is detected. Many monitoring systems use a client-server architecture. In a client-server monitoring architecture, information can either be pulled by a server from clients, or pushed to a server by agents running on client devices. Administrators can perform configuration tasks, on both the server and on client devices.

SUMMARY

The present disclosure involves systems, software, and computer implemented methods for distributed monitoring in clusters with self-healing. One example method includes determining, by a first instance of a monitoring agent of a first node of a cluster, at least one self-monitoring check to perform for the first node. The first node is among multiple, other nodes included in the cluster, including a second node. The at least one self-monitoring check is performed, by the first instance of the monitoring agent. In response to receiving a successful status for the at least one self-monitoring check, a first registry in the first node is updated with the successful status. The first registry includes node statuses for each node in the cluster. In response to receiving an unsuccessful status for the at least one self-monitoring check, at least one first corrective action is performed, by the first instance of the monitoring agent, on the first node. The first registry is updated in the first node with a result of the at least one corrective action. The first registry in the first node is broadcasted to each of the other nodes in the cluster as an updated registry. The updated registry is received by the second node. An error condition for the first node in the updated registry is determined, by a second instance of the monitoring agent running in the second node. At least one second corrective action is performed on the first node, by the second instance of the monitoring agent.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

As an alternative to a client-server architecture for networking monitoring, a distributed multi-node architecture can be used as described herein, in which each node in a system performs monitoring and communicates with other nodes using lightweight protocols. For example, in a cluster of N nodes, each node can be "self-aware," with a self-deployed monitoring agent for performing its own configuration self-check at set intervals. Each node can include a registry that maintains the status of the node and the other N−1 nodes. Node agents can communicate respective status information with other node agents.

Each node can be configured to perform self-healing to rectify its own error condition. Each node can have a registered friend node from the other nodes within the cluster. A friend node of a node in error can also attempt correction to remedy the issues of the node in error. The cluster can become a logical ring of "bilateral friends," and every node can hold management-related information of other nodes in copy in a distributed information schema.

Therefore, performance of distributed network monitoring can be improved as compared to centralized monitoring, with a cost of monitoring shared among all nodes, and with each node being able to monitor for and potentially rectify local issues. A need to maintain a dedicated server for monitoring can be removed, thereby saving physical and human resources. With self-healing nodes, and friend node assistance if self-healing fails, many problems can be solved by the node or its friend node without human intervention, thereby creating a robust and reliable environment. System maintenance, including addition of nodes, node removal, and node reintroduction, can be performed from any node, resulting in an effective, scalable, distributed system.

Distributed monitoring can solve a reliability issue of centralized monitoring—that of a single point of potential failure. With centralized, server-based monitoring, if a centralized server is down, monitoring and corrective action might not be able to be performed within the system until the centralized server is restored. With distributed monitoring, nodes can independently monitor and rectify themselves (and their assigned friend nodes). If a given node goes down, the rest of the system is maintained, and adapts. Specifically, a node identified as in error can be removed, at least temporarily, from the multi-node friend structure, and the friend listing can be modified so that each node has an active and available friend node.

Figure 1:
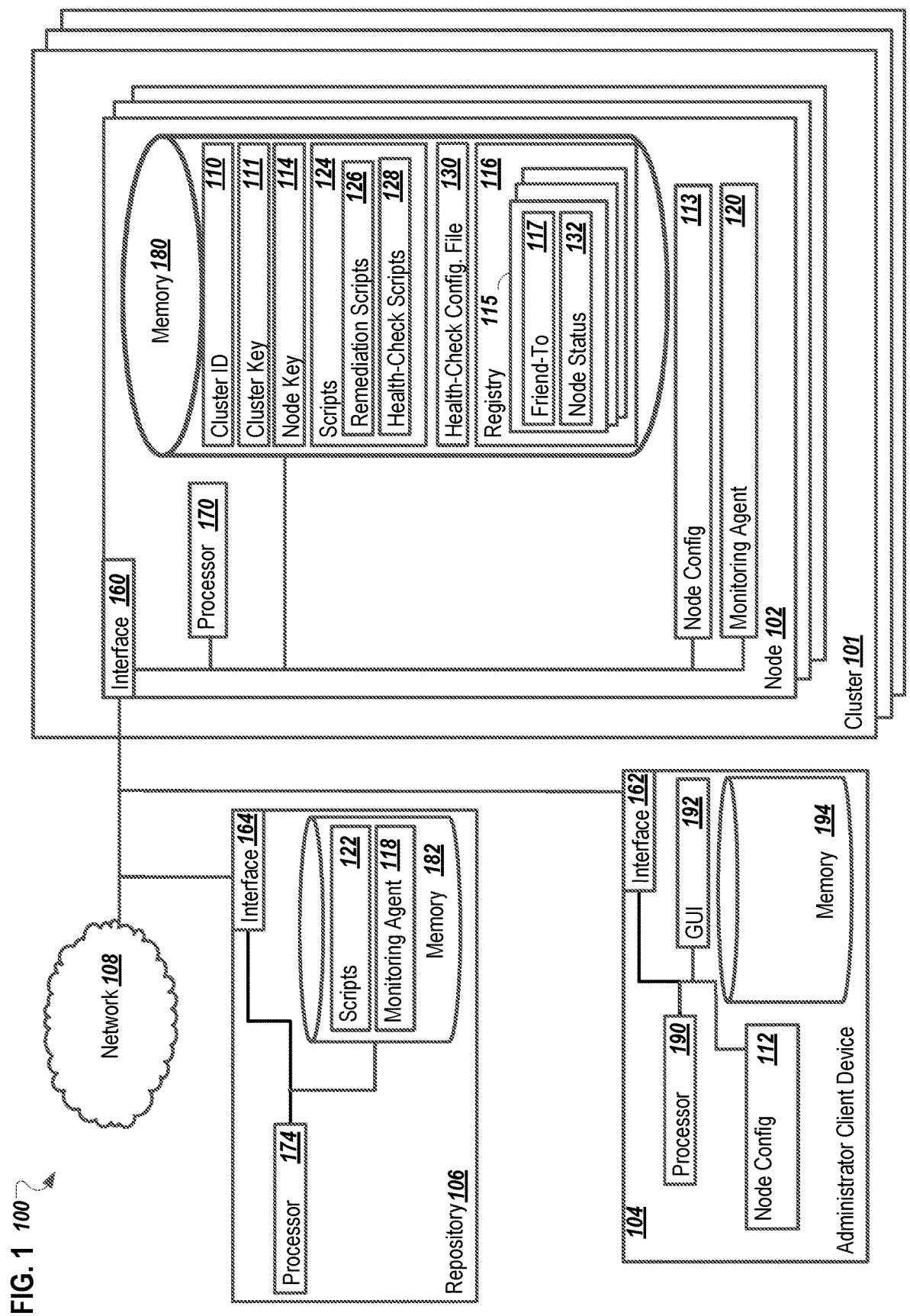
FIG. 1 is a block diagram illustrating an example system for distributed monitoring in clusters with self-healing.

FIG. 1 is a block diagram illustrating an example system 100 for distributed monitoring in clusters with self-healing. Specifically, the illustrated system 100 includes or is communicably coupled with a set of clusters 101, an administrator client device 104, a repository 106, and a network 108. Each cluster 101 includes a set of nodes 102. A node 102 can be a server or other computing device, or some other type of system for which monitoring is desired. A cluster 101 can be a group of related nodes 102. Nodes 102 can include, for example, servers, systems, virtual machines, or components, for database management, configuration management, synchronization, naming registration, application serving, and other functionality. The system 100 provides a multi-node deployment architecture for monitoring, which can be used for any product or system which uses multiple systems, components, or virtual machines for its operation. Nodes for a product can be formed in a cluster 101 that monitors itself, by having cluster nodes monitor themselves and other nodes within the cluster 101.

An administrator can configure each node 102 in a cluster 101 to have a same cluster identifier 110 and cluster key 111. For example, the administrator can use a node configuration application 112 to connect to a given node 102 to configure the cluster identifier 110 and the cluster key 111 for the node 102. The node configuration application 112 can be a command line application or set of commands entered from a command line, or a GUI application, for example. In some implementations, the node configuration application 112 consists of an administrator remotely logging into a node 102 and entering one or more node/cluster configuration commands provided by a local node configuration application 113, for setting the cluster identifier 110 and the cluster key 111.

Once a first node 102 has been configured with the cluster identifier 110 and the cluster key 111, other nodes 102 can be added (e.g., by the administrator). For example, the administrator can invoke an add-node command (using the node configuration application 112 or the local node configuration application 113) when logged into the first node 102. An add-node command can include a node key of a node 102 to add, the cluster identifier 110, and the cluster key 111. A node key can be based on one or more of an IP (Internet Protocol) and a VPC (Virtual Private Cloud) identifier. A node key 114, the cluster identifier 110, and the cluster key 111 can be stored in the added node 102. The administrator can issue an add-node command for all nodes 102 that are to be added. The add-node command can be configured to validate the node key 114, the cluster identifier 110, and cluster key 111, and if each is valid, add the new node 102 to the cluster 101.

Adding a node 102 to the cluster 101 can include adding the node 102 to a node list 115 stored in a registry 116. The registry 116 can include information for each node 102, e.g., keyed by each node key 114, such as node status and node friendship configurations (each described in more detail below). Each node 102 can be configured to broadcast the registry 116 to all other nodes 102 in the cluster 101, e.g., upon node addition, node friendship changes, and node status updates. Each node 102 can be a publisher and subscriber of registry 116 broadcasts. The registry 116 being continually updated by each node 102 and regularly broadcasted throughout the cluster 101 avoids a single point of failure issue that may be present if status information were held at a central server.

Node friendship can be configured when a node 102 is added, or at any other suitable time, e.g., by an administrator. Each node 102 can be designated as a friend to another node 102. Friends can be designated according to an assignment algorithm. One assignment algorithm is a round-robin IP address approach, in which a first node 102 is assigned as a friend to a second node 102 when the second node 102 is next in sequence of IP addresses (or node keys) of nodes 102 within the cluster 101. When a node 102 is added, friendship assignments can be adjusted as needed (e.g., a new node 102 may be inserted into a logical circle of friends, according to IP address (or node key), by being designated as a friend to a node 102 with a next highest IP address value (or node key) in the cluster 101 and friend of a node 102 with a next lowest IP address value (or node key) in the cluster 101. Node friendship relationships can be represented by each node 102 including a friend-to designator 117 (and/or a friend-of designator) in the registry 116. A friend-to designator 117 can be a node key of another node 102 that the given node 102 has been designated to monitor, as described below.

Each node 102 can download a monitoring agent 118 from the repository 106, for local execution as a monitoring agent 120. The monitoring agent 120 can download a set of scripts 122 from the repository 106, for local storage as scripts 124. Scripts 124 obtained from the repository 106 can include remediation scripts 126 and health-check scripts 128. A remediation script 126 is configured to perform (or attempt to perform) one or more corrective actions for the node 102. In some implementations, a health-check script 128 is configured to perform a list of checks. The monitoring agent 120 can be configured to automatically build the list of checks to perform, e.g., by discovering running services and/or resources on the node 102 and generating a configuration file 130 that lists the running services/resources. A health-check script 128 can be configured to check each service or resource in the configuration file 130, to see if the service is running or the resource exists.

The monitoring agent 120 is configured to perform periodic health checks for the node 102 by executing health-check script(s) 128 on a configured schedule. For example, the monitoring agent 120 can execute health-check script(s) 128 once per minute. Result(s) of executing the health-check script(s) 128 can be stored in the registry 116 in association with the node 102, as part of node status 132 for the node 102. Node status 132 can include a timestamp for an executed self-check, one or more status values (e.g., of one or more services that were checked), an overall status of the node 102, or other status information.

If a health check does not return a successful status, the node 102 can execute one or more remediation scripts 126 to attempt to rectify any issues discovered by the health check(s). Remediation scripts 126 can include restarting of components, remounting disk drives, clearing log files, or other actions. Some remediation scripts 126 may perform certain actions based on certain output(s) from the health check(s). The monitoring agent 120 can re-perform health check(s) after remediation script(s) 126 have been performed, and/or can examine output results of the remediation script(s), to determine whether the node 102 was able to rectify discovered issue(s).

A given node 102 can broadcast its copy of the registry 116 to other nodes 102 after health check(s) and remediation attempts have been performed, so that the other nodes 102 know the most recent status of the given node 102. The friend of the given node 102 can analyze the status and can determine when the given node 102 may have an issue that the given node 102 was not able to rectify on its own, based on node status values 132 in a registry 116 received from the given node 102. As another example, the friend node can determine that the given node 102 has not sent a registry 116 at an expected time, and may therefore be having an issue (e.g., node down, communications issue) that is preventing the node 102 from sending status information.

When a friend node has detected a problem or potential problem with the node 102 it is designated to monitor, the friend node can attempt to remediate problem(s) with the monitored node. The friend node can check to see if the monitored node is active (e.g., responsive to pings or other communications). If the monitored node is not active, the friend node can attempt to remotely start the monitored node. If the monitored node is running but the monitoring agent 120 of the monitored node is not responding, the friend node can restart the monitoring agent 120 of the monitored node. The friend node can wait and later check to see if the restarted monitoring agent 120 of the monitored node has successfully solved prior issues with the monitored node (e.g., the friend node can detect that the monitored node has sent a successful status update at a next expected status broadcast time).

In some implementations, the friend node can remotely execute remediation script(s) 126 or perform other actions on the monitored node to attempt rectification. The friend node can be configured to attempt a certain number of remediation steps, for one or more predetermined cycles (e.g., test, check, iterate). The friend node can determine, after attempted remediation steps have been unsuccessful, that the monitored node is down and at least temporarily unrecoverable. The friend node can mark the monitored node as down or in an error state (e.g., in a registry 116 maintained by the friend node), and can then broadcast the updated registry 116 to the other nodes 102 in the cluster. The friend node can initiate other actions, such as an automatic sending of an electronic mail message to an administrator to notify the administrator of the downed status of the monitored node.

When a node is marked as down, friendship relationships of the nodes in the cluster can be automatically updated—without user input or intervention—so that the friend node of the now-down node is a friend to (e.g., now monitors) a different node. Additionally, a node who was being monitored by the now-down node can be assigned to a new friend node. The downed node can be added back to the cluster once the node has been recovered (e.g., by an administrator re-executing the add-node command for the node, or by an automatic detection that the node has been healed and is ready to rejoin the cluster), and friendship links can again be updated, so that the reintroduced node is a friend to, and a friend of, respective nodes in the cluster 101. When reintroduced, a new or different friend relationship can be determined or assigned from the prior friend relationship of the re-added node.

As used in the present disclosure, the terms "computer" and "node" are intended to encompass any suitable processing device. Each node 102 and the repository 106 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, each node 102 and the repository 106 may be adapted to execute any operating system, including Linux, UNIX, Windows, Mac OS®, Java™, Android™, iOS or any other suitable operating system.

Interfaces 160, 162, and 164 are used by respective nodes 102, the administrator client device 104, and the repository 106, respectively, for communicating with other systems in a distributed environment—including within the system 100—connected to the network 108. Generally, the interfaces 160, 162, and 164 each comprise logic encoded in software and/or hardware in a suitable combination and operable to communicate with the network 108. More specifically, the interfaces 160, 162, and 164 may each comprise software supporting one or more communication protocols associated with communications such that the network 108 or interface's hardware is operable to communicate physical signals within and outside of the illustrated system 100.

Each node 102, the administrator client device 104, and the repository 106, each respectively include one or more processors 170, 172, or 174. Each processor in the processors 170, 172, and 174 may be a central processing unit (CPU), a blade, an application specific integrated circuit (ASIC), a field-programmable gate array (FPGA), or another suitable component. Generally, each processor in the processors 170, 172, and 174 executes instructions and manipulates data to perform the operations of a respective computing device.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Each node 102 and repository 106 respectively include memory 180 or memory 182. In some implementations, a given node 102 and/or the repository 106 include multiple memories. The memory 180 and the memory 182 may each include any type of memory or database module and may take the form of volatile and/or non-volatile memory including, without limitation, magnetic media, optical media, random access memory (RAM), read-only memory (ROM), removable media, or any other suitable local or remote memory component. Each of the memory 180 and the memory 182 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the respective computing device.

The administrator client device 104 may generally be any computing device operable to connect to or communicate with the nodes 102 via the network 108 using a wireline or wireless connection. In general, the administrator client device 104 comprises an electronic computer device operable to receive, transmit, process, and store any appropriate data associated with the system 100 of FIG. 1. The administrator client device 104 can include one or more client applications, including the administration application 112. A client application is any type of application that allows the administrator client device 104 to request and view content on the administrator client device 104. In some implementations, a client application can use parameters, metadata, and other information received at launch to access a particular set of data from a given node 102. In some instances, a client application may be an agent or client-side version of the one or more enterprise applications running on an enterprise server (not shown). In some instances, the administrator client device 104 may be one of the nodes 102 within the cluster 101, or may be distributed in two or more nodes 102 within the cluster 101.

The administrator client device 104 further includes one or more processors 190. Each processor 190 included in the administrator client device 104 may be a central processing unit (CPU), an application specific integrated circuit (ASIC), a field-programmable gate array (FPGA), or another suitable component. Generally, each processor 190 included in the administrator client device 104 executes instructions and manipulates data to perform the operations of the administrator client device 104. Specifically, each processor 190 included in the administrator client device 104 executes the functionality required to send requests to nodes 102 and to receive and process responses from nodes 102.

The administrator client device 104 is generally intended to encompass any client computing device such as a laptop/notebook computer, wireless data port, smart phone, personal data assistant (PDA), tablet computing device, one or more processors within these devices, or any other suitable processing device. For example, the administrator client device 104 may comprise a computer that includes an input device, such as a keypad, touch screen, or other device that can accept user information, and an output device that conveys information associated with the operation of the system 100, or the administrator client device 104 itself, including digital data, visual information, or a graphical user interface (GUI) 192.

The GUI 192 of the administrator client device 104 interfaces with at least a portion of the system 100 for any suitable purpose, including generating a visual representation of the administration application 112. In particular, the GUI 192 may be used to view and navigate various Web pages. Generally, the GUI 192 provides the user with an efficient and user-friendly presentation of business data provided by or communicated within the system. The GUI 192 may comprise a plurality of customizable frames or views having interactive fields, pull-down lists, and buttons operated by the user. The GUI 192 contemplates any suitable graphical user interface, such as a combination of a generic web browser, intelligent engine, and command line interface (CLI) that processes information and efficiently presents the results to the user visually.

Memory 194 included in the administrator client device 104 may include any memory or database module and may take the form of volatile or non-volatile memory including, without limitation, magnetic media, optical media, random access memory (RAM), read-only memory (ROM), removable media, or any other suitable local or remote memory component. The memory 194 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the administrator client device 104.

There may be any number of client devices 104 associated with, or external to, the system 100. For example, while the illustrated system 100 includes one administrator client device 104, alternative implementations of the system 100 may include multiple client devices 104 communicably coupled to the nodes 102 and/or the network 108, or any other number suitable to the purposes of the system 100. Additionally, there may also be one or more additional client devices 104 external to the illustrated portion of system 100 that are capable of interacting with the system 100 via the network 108. Further, the term "client", "client device" and "user" may be used interchangeably as appropriate without departing from the scope of this disclosure. Moreover, while the administrator client device 104 is described in terms of being used by a single user, this disclosure contemplates that many users may use one computer, or that one user may use multiple computers.

Figure 2:
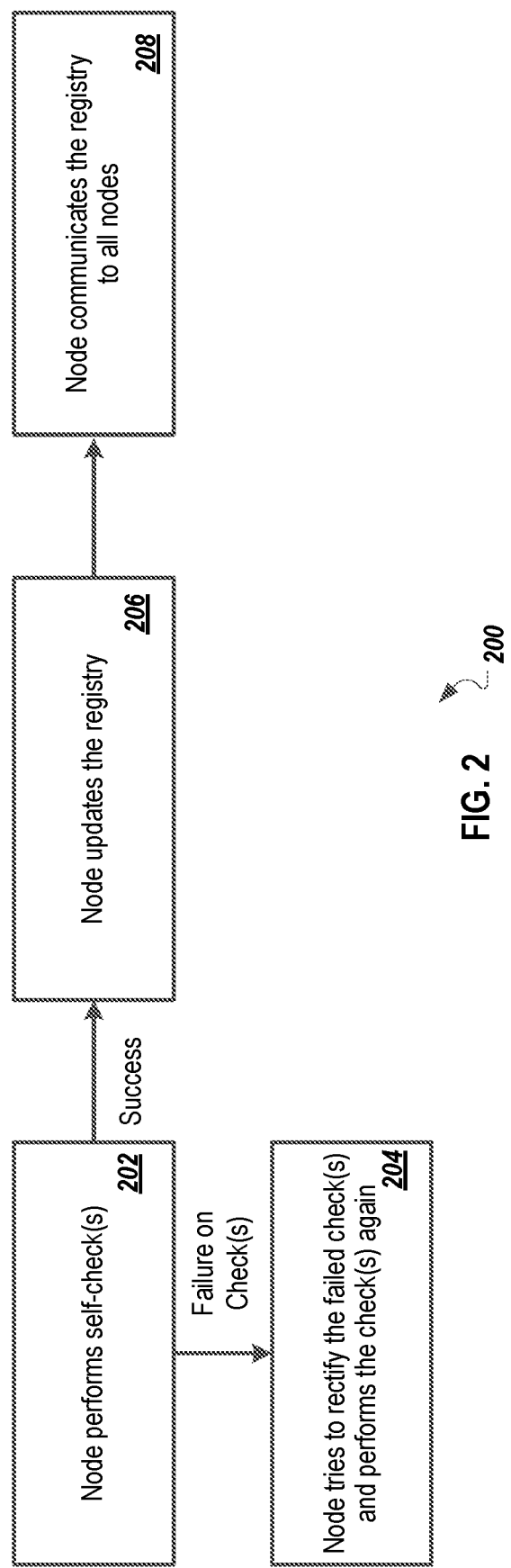
FIG. 2 is a flowchart of an example method for performance of node self-checks.

FIG. 2 is a flowchart of an example method 200 for performance of node self-checks. It will be understood that method 200 and related methods may be performed, for example, by any suitable system, environment, software, and hardware, or a combination of systems, environments, software, and hardware, as appropriate. For example, one or more of a client, a server, or other computing device can be used to execute method 200 and related methods and obtain any data from the memory of a client, the server, or the other computing device. In some implementations, the method 200 and related methods are executed by one or more components of the system 100 described above with respect to FIG. 1. For example, the method 200 and related methods can be executed by the node 102 of FIG. 1.

At 202, a node performs a check on itself. If the self-check is a failure, the node, at 204, attempts to rectify the failed check and re-performs the self-check. The node, at 206, updates a registry with information with self-check or re-check statuses. If a re-check succeeds, the node updates the registry with a success value. If the re-check fails, the node updates the registry with an error value. At 208, the registry for the node is communicated to all of the other nodes in the cluster.

Figure 3:
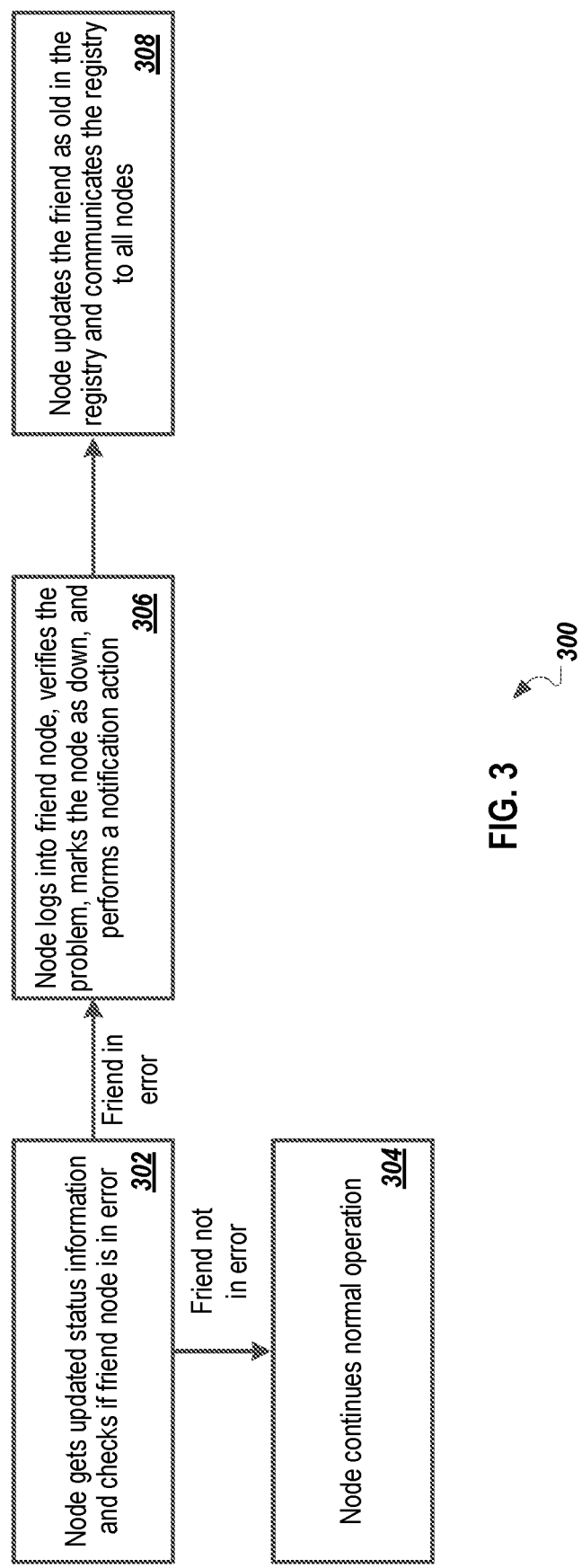
FIG. 3 is a flowchart of an example method for performance of node correction by a friend node.

FIG. 3 is a flowchart of an example method 300 for performance of node correction by a friend node. It will be understood that method 300 and related methods may be performed, for example, by any suitable system, environment, software, and hardware, or a combination of systems, environments, software, and hardware, as appropriate. For example, one or more of a client, a server, or other computing device can be used to execute method 300 and related methods and obtain any data from the memory of a client, the server, or the other computing device. In some implementations, the method 300 and related methods are executed by one or more components of the system 100 described above with respect to FIG. 1. For example, the method 300 and related methods can be executed by the node 102 of FIG. 1 that is a friend of another node in the system 100.

At 302, a node gets a status from a friend node (e.g., in a received registry) and performs analyzes the status to determine whether the friend node is in an error state. At 304, in response to determining that the friend node is not in an error state, the node continues normal operation (e.g., waits for subsequent status information). At 306, in response to determining that the friend node is in an error state, the node logs in to the friend node, verifies the error condition (e.g., after attempts at rectification), marks the node as down (e.g., in a registry), and performs a notify action, such as mail-send (e.g., to an administrator). At 308, the node marks the friend node as in an error condition in the registry and communicates the registry to all of the other nodes in the cluster.

Figure 4:
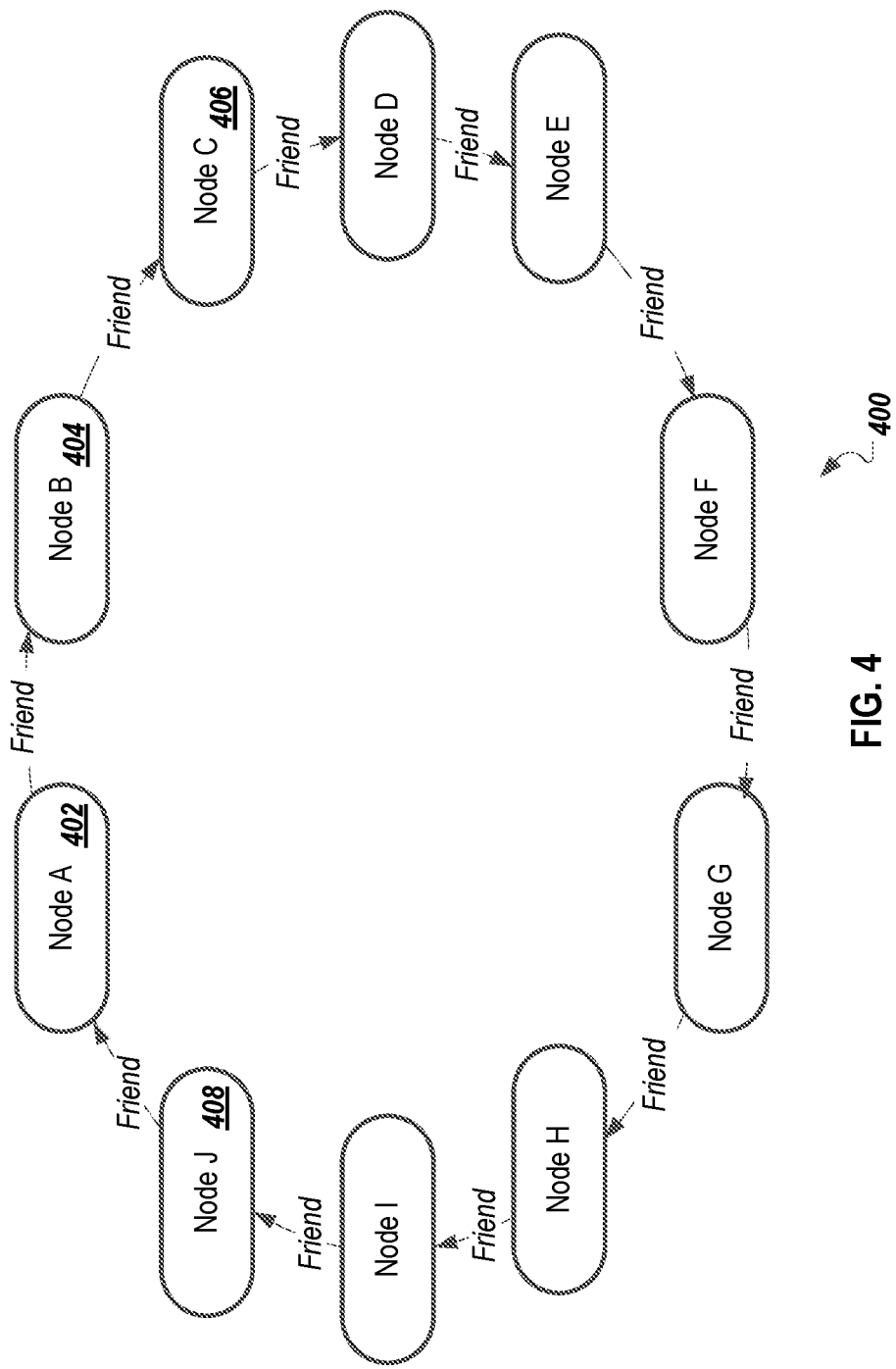
FIG. 4 illustrates an example of a node graph of a cluster.

FIG. 4 illustrates an example of a node graph 400 of a cluster. The node graph 400 represents a logical circle of nodes in a cluster in which each node is configured as a friend node to another node. A friend relationship can be unidirectional. For example, a node A 402 can be a friend to a node B 404, and the node B 404 can be a friend to a node C 406, but the node B, in this example, is not configured as a friend to the node A 402, and the node C 406 is not configured as a friend to the node B 404. Each node is configured as a friend to one other node, and has another node which is configured as its friend. A node J 408 being configured as a friend to the node A 402 completes a logical circle of friend configurations.

Figure 5:
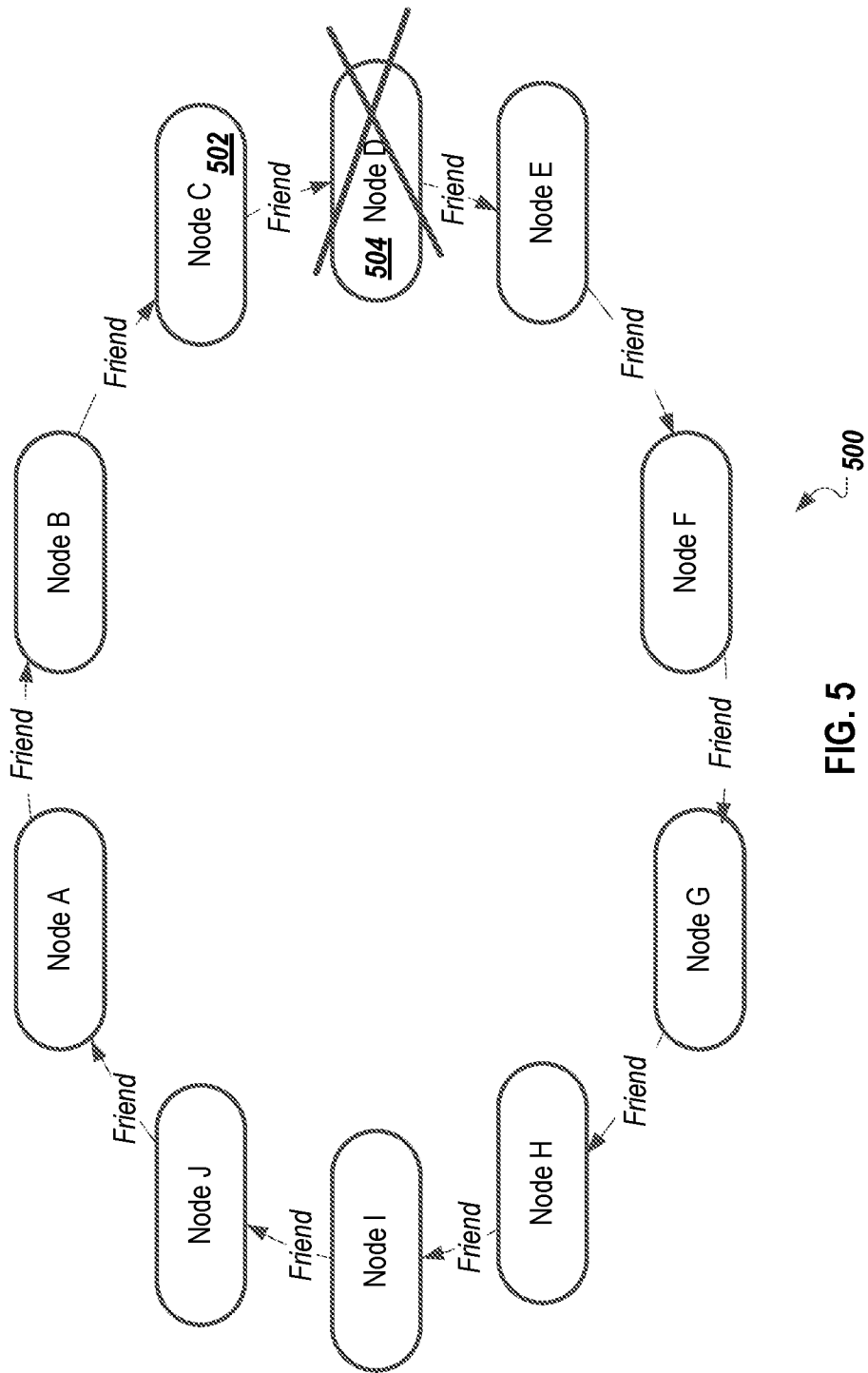
FIG. 5 illustrates a node graph after a node has been marked as in an error condition.

FIG. 5 illustrates a node graph 500 after a node has been marked as in an error condition. A node C 502 has confirmed that a node D 504 is in an error condition. The node C 502 can mark the node D 504 as being in the error condition, in a registry, and make the registry available to all of the other nodes in the cluster.

Figure 6:
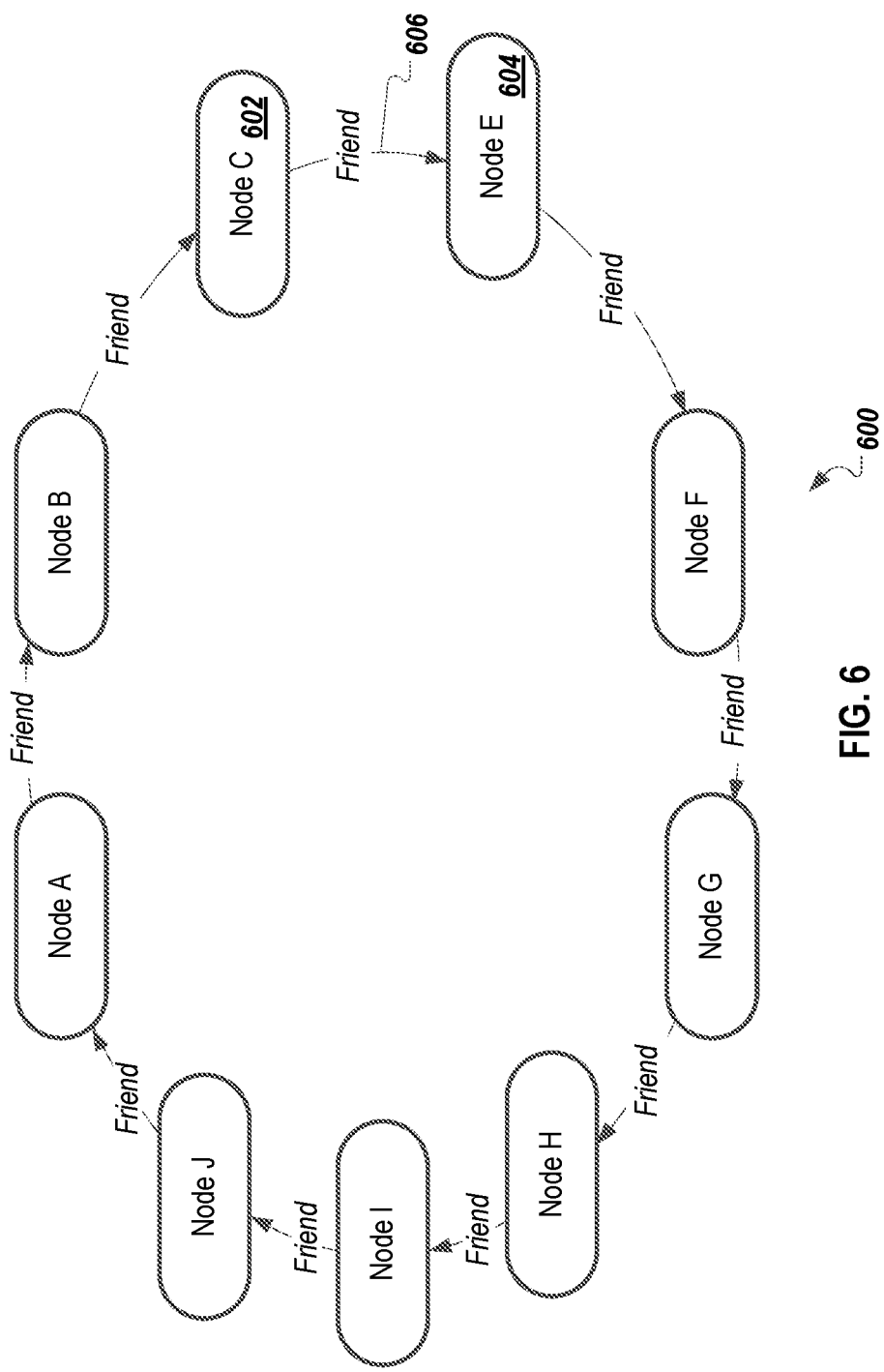
FIG. 6 illustrates a node graph after a node in an error condition has been removed from a cluster.

FIG. 6 illustrates a node graph 600 after a node in an error condition has been removed from a cluster. A node C 602 has, as described above, marked a previously included node D (e.g., the node D 504) as being in an error condition, and consequently the node D 504 has been removed from the cluster, due to being in the error condition. The node C 602 is then, temporarily, not assigned as a friend to another node. However, after the node D 504 has been removed, the node C 602 is made to be a friend of a different node, a node E 604, as illustrated by a friendship link 606. The node E 604 had been previously linked to the node D 504, with the node D 504 being configured as friend to the node E 604. The friendship link 606 represents a reconnection of the node graph 600 after removal of the node D 504, so that the node C is a friend of a new node (e.g., the node E 604) and the node E 604 is assigned a new friend after losing a friendship relationship with the node D 504. After the error condition in the node D 504 is resolved, the node D 504 can be added back into the node graph 600, including assigning the node D 504 to a new friend node and making the node D 504 a friend of one of the nodes in the node graph 600. The node D 504 may, or may not, be linked to nodes it was previously associated with before being removed. As described above, friendship assignments can be algorithmic, such as based on IP address or another identifier.

Figure 7:
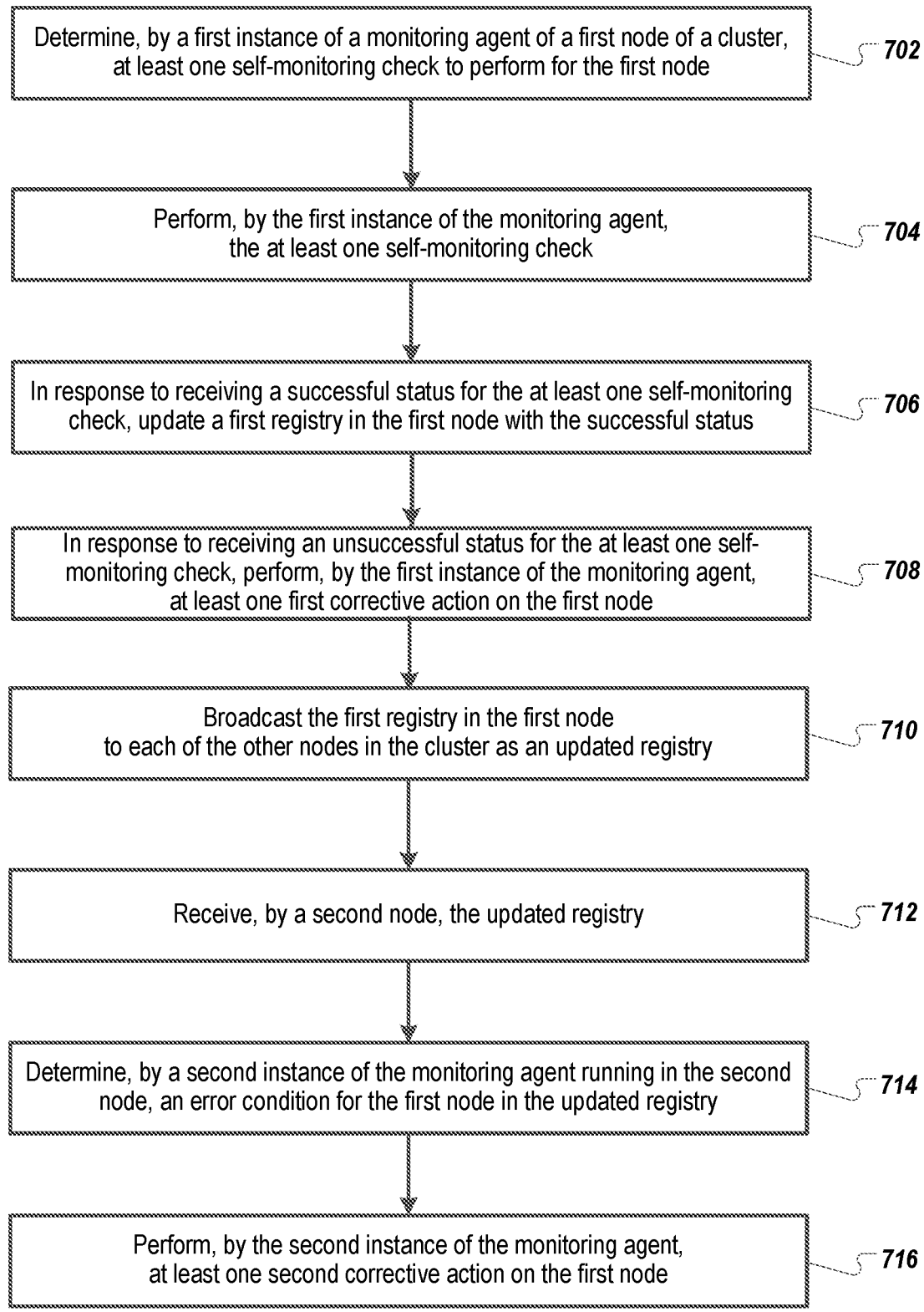
FIG. 7 is a flowchart of an example method for distributed monitoring in clusters with self-healing.

FIG. 7 is a flowchart of an example method for distributed monitoring in clusters with self-healing. It will be understood that method 700 and related methods may be performed, for example, by any suitable system, environment, software, and hardware, or a combination of systems, environments, software, and hardware, as appropriate. For example, one or more of a client, a server, or other computing device can be used to execute method 700 and related methods and obtain any data from the memory of a client, the server, or the other computing device. In some implementations, the method 700 and related methods are executed by one or more components of the system 100 described above with respect to FIG. 1. For example, the method 700 and related methods can be executed by various monitoring agents 120 of FIG. 1.

At 702, at least one self-monitoring check to perform for a first node is determined by a first instance of a monitoring agent of the first node of a cluster. The first node is among multiple, other nodes included in the cluster, including a second node. The second node can be a designated friend of the first node that has been assigned to monitor the first node.

At 704, the at least one self-monitoring check is performed by the first instance of the monitoring agent.

At 706, in response to receiving a successful status for the at least one self-monitoring check, a first registry in the first node is updated with the successful status. The first registry includes node statuses for each node in the cluster.

At 708, in response to receiving an unsuccessful status for the at least one self-monitoring check, at least one first corrective action is performed on the first node, by the first instance of the monitoring agent, and status information for the first node in the first registry is updated with a result of the at least one corrective action.

At 710, the first registry in the first node is broadcast to each of the other nodes in the cluster as an updated registry.

At 712, the updated registry is received, by the second node.

At 714, an error condition for the first node in the updated registry is determined, by a second instance of the monitoring agent running in the second node.

At 716, at least one second corrective action is performed on the first node, performing, by the second instance of the monitoring agent. The second instance of the monitoring agent can update, in a second registry in the second node, node status for the first node to indicate whether the first node is still in the error condition after performance of the at least one second corrective action. The second registry can indicate that the first node is no longer included in the cluster due to the error condition in the first node. After the first node is removed from the cluster, the second node can be assigned as a friend to a different, third node. The second node can broadcast the second registry to each of the other nodes in the cluster other than the second node. If the first node is still in the error condition, the second instance of the monitoring agent can send an alert message to an administrator regarding the error condition in the first node.

The second node (or another node) can receive a request to re-add the first node to the cluster. For example, an administrator can re-add the node after the error condition has been resolved. The second registry can be updated to indicate that the first node has been re-added to the cluster. Friendship assignments in the second registry can be updated so that each node, including the first node, is assigned as a friend node to another node. The second registry can be broadcast to each of the other nodes in the cluster other than the second node, so that all nodes know the updated friendship assignments and that the first node is now again included in the cluster.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure.

Other changes, substitutions, and alterations are also possible without departing from the spirit and scope of this disclosure.

What is claimed is:

1. A system comprising:
a cluster of nodes including at least a first node and a second node, wherein each node in the cluster includes a monitoring agent and a registry for recording node status values for each node in the cluster;
wherein a first monitoring agent of the first node is configured to:
perform at least one self-monitoring check for the first node;
in response to receiving a successful status for the at least one self-monitoring check, update a first registry in the first node with the successful status;
in response to receiving an unsuccessful status for the at least one self-monitoring check, perform at least one first corrective action on the first node and update the first registry in the first node with a result of the at least one corrective action; and
broadcast the first registry in the first node to each of the other nodes in the cluster as an updated registry; and
wherein a second monitoring agent of the second node is configured to:
receive the updated registry;
determine an error condition for the first node in the updated registry; and
perform at least one second corrective action on the first node.

2. The system of claim 1, wherein the second node is designated as a friend node to the first node.

3. The system of claim 1, wherein the second monitoring agent of the second node is configured to:
determine that the at least one second corrective action was unsuccessful;
update, in a second registry in the second node, node status for the first node to indicate the error condition in the first node; and
broadcast the second registry to each of the other nodes in the cluster other than the second node.

4. The system of claim 3, wherein the second monitoring agent of the second node is configured to send an alert message to an administrator regarding the error condition in the first node.

5. The system of claim 3, wherein the second registry indicates that the first node is no longer included in the cluster due to the error condition in the first node.

6. The system of claim 5, wherein the second monitoring agent of the second node is configured to assign the second node as a friend to a third node in response to determining that the first node is no longer included in the cluster.

7. The system of claim 5, wherein the second monitoring agent of the second node is configured to
receive a request to re-add the first node to the cluster;
update the second registry to indicate that the first node has been re-added to the cluster;
adjust friendship assignments in the second registry so that each node, including the first node, is assigned as a friend node to another node; and
broadcast the second registry to each of the other nodes in the cluster other than the second node.

8. The system of claim 7, wherein the second monitoring agent of the second node is configured to:
determine that an amount of time since the first node has sent status information is more than a threshold; and
perform the at least one second corrective action on the first node in response to determining that the amount of time since the first node has sent status information is more than the threshold.

9. A system comprising:
a cluster of nodes including at least a first node, a second node, and a third node, wherein each node in the cluster includes a monitoring agent and a registry for recording node status values for each node in the cluster;
wherein a first monitoring agent of the first node is configured to:
determine whether a first registry included in the first node includes an error condition associated with the second node;
in response to determining that first registry includes the error condition associated with the second node, perform at least one corrective action on the second node;
determine a result of the at least one corrective action;
update the first registry in the first node with a result of the at least one corrective action; and
broadcast the first registry in the first node to each of other nodes in the cluster other than the first node as an updated registry, wherein at least the third node receives the updated registry.

10. The system of claim 9, wherein the second node is designated as a friend node to the first node.

11. The system of claim 9, wherein the result of the at least one corrective action indicates that the at least one corrective action was unsuccessful.

12. The system of claim 11, wherein the first monitoring agent of the first node is configured to send an alert message to an administrator regarding the error condition associated with the second node.

13. The system of claim 11, wherein the updated registry indicates that the second node is no longer included in the cluster due to the error condition associated with the second node.

14. The system of claim 13, wherein the first monitoring agent of the first node is configured to assign the third node as a friend to the first node in response to determining that the second node is no longer included in the cluster.

* * * * *